United States Patent
Shah et al.

(10) Patent No.: US 8,153,982 B1
(45) Date of Patent: Apr. 10, 2012

(54) YTTRIUM-CONTAINING SCINTILLATOR COMPOSITIONS, DEVICES AND METHODS

(75) Inventors: Kanai S. Shah, Newton, MA (US); William M. Higgins, Westborough, MA (US); Edgar V. Van Loef, Allston, MA (US); Jaroslaw Glodo, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 491 days.

(21) Appl. No.: 12/490,955

(22) Filed: Jun. 24, 2009

Related U.S. Application Data

(60) Provisional application No. 61/075,694, filed on Jun. 25, 2008.

(51) Int. Cl.
*G01T 1/20* (2006.01)
*G01N 21/64* (2006.01)
(52) U.S. Cl. .................... 250/361 R; 250/483.1
(58) Field of Classification Search .......... 250/361 R, 250/483.1
See application file for complete search history.

(56) References Cited

U.S. PATENT DOCUMENTS

| 7,202,477 | B2 | 4/2007 | Srivastava et al. |
| 7,525,100 | B2 * | 4/2009 | Kraemer et al. .......... 250/390.11 |
| 2009/0246495 | A1 * | 10/2009 | Richaud et al. .............. 428/220 |

OTHER PUBLICATIONS

Bessiere et al., "Luminescence and scintillation properties of $Cs_2LiYCl_6:Ce^{3+}$ for γ and neutron detection," *Nucl. Instr. Method. in Phys. Res.* A 537:242-246 (2005).
Combes et al., "Optical and scintillation properties of pure and $Ce^{3+}$-doped $Cs_2LiYCl_6$ and $Li_3YCl_6:Ce^{3+}$ crystals," *J. Luminescence* 82:299-305 (1999).
Bessiere et al., "Luminescence and scintillation properties of the small band gap compound $LaI_3:Ce^{3+}$ ," *Nucl. Inst. Method. in Phys. Res.* A 537:22-26 (2005).
Bollinger and Thomas, "Measurement of the time dependence of scintillation intensity by a delayed-coincidence method," *Rev. Sci. Meth.* 32:1044-1050 (1961).

* cited by examiner

*Primary Examiner* — David Porta
*Assistant Examiner* — Carolyn Igyarto
(74) *Attorney, Agent, or Firm* — Kilpatrick Townsend & Stockton LLP

(57) ABSTRACT

The present invention relates to scintillator compositions and related devices and methods. The scintillator compositions may include, for example, a scintillation compound and a dopant, the scintillation compound having the formula $CsLi(La_xY_{1-x})Z$, where Z is a halide. The scintillator composition can include a dopant or mixture of dopants.

21 Claims, 4 Drawing Sheets

YTTRIUM-CONTAINING SCINTILLATOR COMPOSITIONS, DEVICES AND METHODS

CROSS-REFERENCE TO RELATED APPLICATION

The present invention claims the benefit of priority under 35 U.S.C. §119(e) of U.S. Provisional Application No. 61/075,694, filed Jun. 25, 2008, the entire content of which is incorporated herein by reference.

BACKGROUND OF THE INVENTION

The present invention relates to scintillator compositions and related devices and methods. More specifically, the present invention relates to yttrium-containing scintillator compositions suitable for use, for example, in radiation detection, including gamma-ray spectroscopy, and X-ray and neutron detection.

Scintillation spectrometers are widely used in detection and spectroscopy of energetic photons (e.g., X-rays, gamma-rays, etc.). Such detectors are commonly used, for example, in nuclear and particle physics research, medical imaging, diffraction, non destructive testing, nuclear treaty verification and safeguards, nuclear non-proliferation monitoring, and geological exploration.

Important requirements for the scintillation crystals used in these applications include high light output, transparency to the light it produces, high stopping efficiency, fast response, good proportionality, low cost, and availability in large volume. These requirements on the whole cannot be met by many of the commercially available scintillator compositions. While general classes of chemical compositions may be identified as potentially having some attractive scintillation characteristic(s), specific compositions/formulations having both scintillation characteristics and physical properties necessary for actual use in scintillation spectrometers and various practical applications have proven difficult to predict. Specific scintillation properties are not necessarily predictable from chemical composition alone, and preparing effective scintillator compositions from even candidate materials often proves difficult. For example, while the composition of sodium chloride had been known for many years, the invention by Hofstadter of a high light-yield and conversion efficiency scintillator from sodium iodide doped with thallium launched the era of modern radiation spectrometry. More than half a century later, thallium doped sodium iodide, in fact, still remains one of the most widely used scintillator materials. Since the invention of NaI(Tl) scintillators in the 1940's, for half a century radiation detection applications have depended to a significant extent on this material. The fields of nuclear medicine, radiation monitoring, and spectroscopy have grown up supported by NaI(Tl). Although far from ideal, NaI(Tl) was relatively easy to produce for a reasonable cost and in large volume. With the advent of X-ray CT in the 1970's, a major commercial field emerged as did a need for different scintillator compositions, as NaI(Tl) was not able to meet the requirements of CT imaging. Later, the commercialization of positron emission tomography (PET) imaging provided the impetus for the development of yet another class of detector materials with properties suitable for PET.

As the methodology of scintillator development evolved, new materials have been added, and yet, specific applications are still hampered by the lack of scintillators suitable for particular applications. Today, the development of new scintillator compositions continues to be as much an art as a science, since the composition of a given material does not necessarily determine its properties as a scintillator, and because scintillation properties are strongly influenced by the history (e.g., fabrication process) of the material as it is formed.

Thus, there is continued interest in the search for new and useful scintillator compositions and formulations with both the enhanced performance and the physical characteristics needed for use in various applications.

BRIEF SUMMARY OF THE INVENTION

The present invention provides yttrium-containing scintillator compositions, as well as related devices and methods. Compositions can include CsLi(LaY) Halides, or a compound having the formula $CsLi(La_xY_{1-x})Z$, where Z is a halide and x is greater than zero and less than one.

Scintillator compositions of the present invention have demonstrated emission characteristics indicating suitability for use in various applications. For example, scintillation properties of the compositions can include peak emission wavelengths from about 380 to about 420 nm, which is well matched to PMTs as well as silicon diodes used in nuclear instrumentation and a peak wavelength for gamma-ray spectroscopy.

In one aspect of the invention, a scintillator composition can include a compound having the formula $CsLi(La_xY_{1-x})Z$, such that Z can include a halide such as F, Cl, Br, or I. Described another way, a scintillator composition includes a mixture of at least two CsLiLaZ and CsLiYZ compounds. Compositions of the invention can include mixed halide compositions. Scintillator compositions disclosed herein can include a dopant or a mixture of dopants.

In another aspect, the invention further includes systems and devices making use of the scintillator compositions of the present invention. A system or device can include, for example, a radiation detection device having a $CsLi(La_xY_{1-x})Z$ scintillation composition, and a photodetector assembly optically coupled to the scintillator composition. The photodetector assembly can include, for example, a photomultiplier tube, a photo diode, or a PIN detector. The device may further include a data analysis, or computer, system for processing and analyzing detected signals. Exemplary devices or assemblies can include an X-ray and/or neutron detector assembly, as well as imaging systems. For example, the device can include electronics configured for performing pulse-shape analysis to differentiate gamma ray from neutron emissions. Scintillator compositions of the present invention can further find use in a variety of known detector or imaging systems commonly using scintillator compositions, and methods of the present invention can include radiation detection and/or imaging applications using the aforementioned devices/systems.

In yet another aspect, the invention includes a method of performing radiation detection. Such a method can include, for example, providing a detection device having a detector assembly including a $CsLi(La_xY_{1-x})Z$ scintillator composition, and positioning a target within a field of view of the scintillator as to detect emissions from the target. Emissions can include, for example, gamma-ray, X-ray, or neutron emissions. A target can include various potential sources of detectable emissions including neutron emitters (e.g., plutonium and the like), gamma-ray sources (e.g., uranium and the like), X-ray sources, etc.

For a fuller understanding of the nature and advantages of the present invention, reference should be had to the ensuing detailed description taken in conjunction with the accompanying drawings. The drawings represent embodiments of the present invention by way of illustration. The invention is capable of modification in various respects without departing from the invention. Accordingly, the drawings/figures and description of these embodiments are illustrative in nature, and not restrictive.

DETAILED DESCRIPTION OF THE INVENTION

Figure 1:
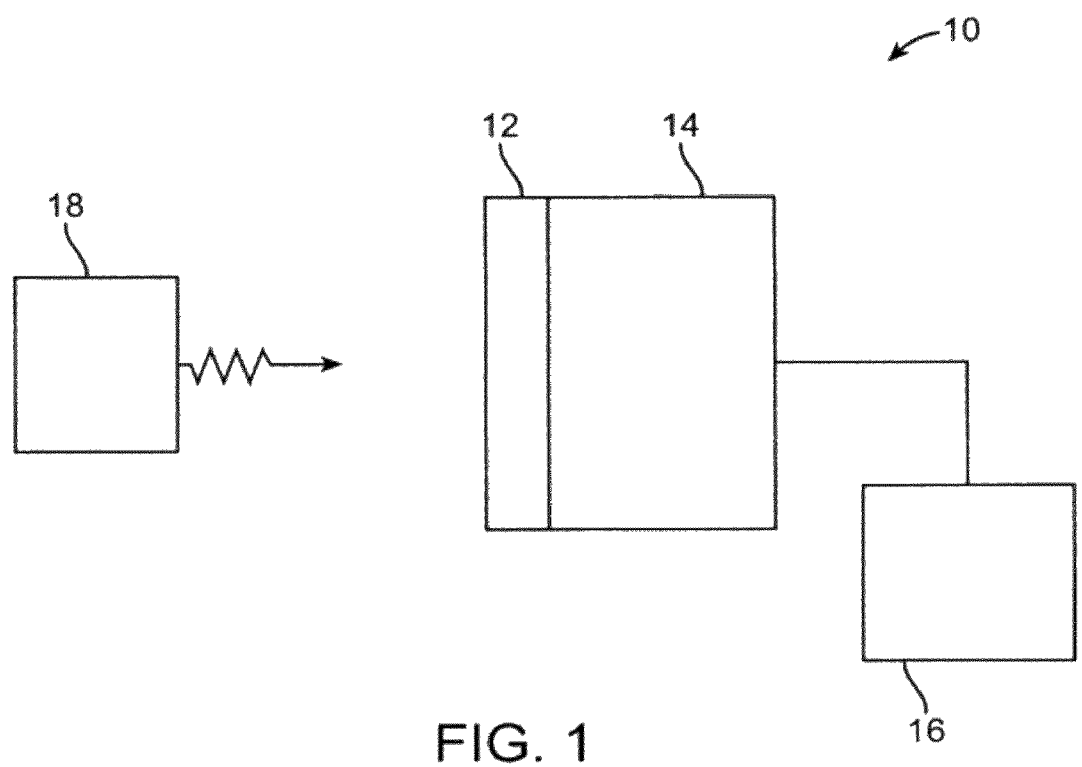
FIG. 1 is a conceptual diagram of a detector assembly of the present invention.

This invention will be better understood with resort to the following definitions:

A. Rise time, in reference to a scintillation crystal material, shall mean the speed with which its light output grows once a gamma-ray has been stopped in the crystal. The contribution of this characteristic of a scintillator combined with the decay time contribute to a timing resolution.

B. A Fast timing scintillator (or fast scintillator) typically requires a timing resolution of about 500 ps or less. For certain PET applications (e.g., time-of-flight (TOF)), the fast scintillator should be capable of localizing an annihilation event as originating from within about a 30 cm distance, i.e., from within a human being scanned.

C. Timing accuracy or resolution, usually defined by the full width half maximum (FWHM) of the time of arrival differences from a point source of annihilation gamma-rays. Because of a number of factors, there is a spread of measured values of times of arrival, even when they are all equal. Usually they distribute along a bell-shaped or Gaussian curve. The FWHM is the width of the curve at a height that is half of the value of the curve at its peak.

D. Light Output shall mean the number of light photons produced per unit energy deposited by the detected gamma-ray, typically the number of light photons/MeV.

E. Stopping power or attenuation shall mean the range of the incoming X-ray or gamma-ray in the scintillation crystal material. The attenuation length, in this case, is the length of crystal material needed to reduce the incoming beam flux to $1/e^-$.

F. Proportionality of response (or linearity). For some applications (such as CT scanning) it is desirable that the light output be substantially proportional to the deposited energy. For applications such as spectroscopy, non-proportionality of response is an important parameter. In a typical scintillator, the number of light photons produced per MeV of incoming gamma-ray energy is not constant. Rather, it varies with the energy deposited by the stopped gamma-ray. This has two deleterious effects. The first is that the energy scale is not linear, but it is possible to calibrate for the effect. The second is that it degrades energy resolution. To see how this occurs, consider a scintillator that produces 300 photons at 150 keV, 160 photons at 100 keV and 60 photons at 50 keV. From statistics alone, the energy resolution at 150 keV should be the variability in 300 photons, which is 5.8%, or 8.7 keV. If every detected event deposited 150 keV in one step this would be the case. On the other hand, if, as it occurs, an event deposited 100 keV in a first interaction and then another 50 keV in a second interaction, the number of photons produced would not be 300 on the average, but 160+60=220 photons, for a difference of 80 photons or 27%. In multiple detections, the peak would broaden well beyond the theoretical 8.7 keV. The smaller the non-proportionality the smaller this broadening and the closer the actual energy resolution approaches the theoretical limit.

A scintillator composition of the present invention can include a compound having the formula $CsLi(La_xY_{1-x})Z$, where Z is a halide such as F, Cl, Br, or I, or a mixture of halides. Such a scintillator composition can be formed from a mixture of at least two CsLiLaZ and CsLiYZ compounds. The ratio of La to Y in a composition may vary considerably. For example, where a composition is formed from two different CsLiLaZ and CsLiYZ compounds molar ratios in the range of about 1:99 to about 99:1 are possible. In one example, molar ratios of about 10:90 to about 90:10 (e.g., about 50:50) can be selected. Thus, the value for x in the formula $CsLi(La_xY_{1-x})Z$, which relates to the ratios of La and Y, can range from about greater than zero to about less than one. Scintillator compositions can further include a dopant, such as a cerium dopant, as further described below. In one example, a composition includes the compound $Cs_2Li(La_{0.5}Y_{0.5})Cl_6$:Ce.

As will be recognized, compositions of the present invention can vary, for example, with respect to the ratio of La to Y and/or ratios of particular halides in mixed halide compositions. The specific selected ratios of compounds can depend on various factors, such as the desired scintillation properties, e.g., light output, energy resolution, etc. As different compositions falling within the scope defined by the present invention can vary as noted (e.g., La to Y ratio, halides in mixed halide compositions, etc.), one advantage of the present invention includes the ability to select or customize a particular composition ratio or formulation, where a particular ratio/formulation may be selected at least partially based on intended use of the scintillator composition and/or desired properties or scintillation/performance characteristics, and the like. For example, a particular composition ratio/formulation may be selected based on one or more of a variety of factors, such as desired stopping power (e.g., at least partially as a function of atomic number), neutron response, bandgap levels tuning/optimization for Ce emission and light output, pulse shape discrimination, gamma-ray sensitivity, and the like.

The scintillator compositions of the invention are particularly useful, for example, for spectroscopy detection of energetic photons (e.g., X-rays, gamma-rays), as well as for neutron emission detection. Notable characteristics for the scintillation compositions of the invention include surprisingly robust light output, high gamma-ray and neutron stopping efficiency (attenuation), fast response, and good non-proportionality. Furthermore, the scintillator compositions can be efficiently and economically produced. Thus, detectors having scintillator compositions described in the present invention are useful in a wide variety of applications, including without limitation nuclear and high energy physics research, medical imaging, diffraction, non-destructive testing, nuclear treaty verification and safeguards, and geological exploration.

The scintillator compositions of the present invention can optionally include a "dopant". Dopants can affect certain properties, such as physical properties (e.g., brittleness, etc.) as well as scintillation properties (e.g., luminescence, etc.) of the scintillator composition. The dopant can include, for example, cerium (Ce), praseodymium (Pr), lutetium (Lu), lanthanum (La), europium (Eu), samarium (Sm), strontium (Sr), thallium (Tl), chlorine (Cl), fluorine (F), iodine (I), and mixtures of any of the dopants. Where certain halides are included as dopants, such dopants will be present in the scintillator composition in addition to those halide(s) already otherwise present in the scintillator compound. The amount of dopant present will depend on various factors, such as the application for which the scintillator composition is being used; the desired scintillation properties (e.g., emission properties, timing resolution, etc.); and the type of detection device into which the scintillator is being incorporated. For example, the dopant is typically employed at a level in the range of about 0.1% to about 20%, by molar weight. In certain embodiments, the amount of dopant is in the range of about 0.1% to less than about 100%, or about 0.1% to about 5.0%, or about 5.0% to about 20%, by molar weight.

Characteristics of the scintillator compositions of the present invention include robust light output, good proportionality, and fast response. In one embodiment, scintillation properties of properties of $CsLi(La_xY_{1-x})$ halide crystals included a peak emission wavelength at about 380 nm, which is well matched to PMTs as well as silicon diodes used in many detection and imaging systems. Scintillator compositions of the present invention include scintillators with rapid rise time and relatively fast decay-time constants. Rise time of the scintillator compositions will typically be less than about 5 ns, and more typically less than about 3 ns (e.g., about 1ns to about 3 ns). Decay time constant will typically be in a range of about 1-2000 ns, including less than about 30, 200, or 2000 ns. Scintillators will typically include a light output greater than about 5,000 photons/Mev, 10,000 photons/MeV or 15,000 photons/MeV, and more typically greater than about 20,000 photons/MeV.

The scintillator compositions of the invention may be prepared in several different forms. In some embodiments, the composition is in a crystalline form (e.g., monocrystalline). Scintillation crystals, such as monocrystalline scintillators, have a greater tendency for transparency than other forms. Scintillators in crystalline form (e.g., scintillation crystals) are often useful for high-energy radiation detectors, e.g., those used for gamma-ray or X-ray detection. However, the composition can include other forms as well, and the selected form may depend, in part, on the intended end use of the scintillator. For example, a scintillator can be in a powder form. It can also be prepared in the form of a ceramic or polycrystalline ceramic. Other forms of scintillation compositions will be recognized and can include, for example, glasses, deposits, vapor deposited films, and the like. It should also be understood that a scintillator composition might contain small amounts of impurities. Also, minor amounts of other materials may be purposefully included in the scintillator compositions to affect the properties of the scintillator compositions.

Scintillator compositions can be substantially pure (e.g., about 99% scintillator composition or greater) or may contain certain amounts of other compounds or impurities. In some cases, impurities may originate, for example, with starting materials for composition preparation. Typically, impurities constitute less than about 0.1% by weight of the scintillator composition, and often less than about 0.01% by weight of the composition. In some instances, minor amounts of other materials may be purposefully included in the scintillator compositions. For example, minor amounts of other rare earth metals, oxides can be added to affect scintillation properties, such as reduce afterglow, and the like. In some embodiments, $CsLi(La_xY_{1-x})Z$ scintillator compositions can include mixed scintillator compositions or an amount of one or more scintillator compounds other than $CsLi(La_xY_{1-x})Z$. In another embodiment, $CsLi(La_xY_{1-x})Z$ scintillator compositions can include mixed halide compositions, e.g., where Z includes a mixture of two or more halides.

Methods for making crystal materials can include those methods described herein and may further include other techniques. Typically, the appropriate reactants are melted at a temperature sufficient to form a congruent, molten composition. The melting temperature will depend on the identity of the reactants themselves (see, e.g., melting points of reactants), but is usually in the range of about 300° C. to about 1350° C. Non-limiting examples of the crystal-growing methods can include certain techniques of the Bridgman-Stockbarger methods; the Czochralski methods, the zone-melting methods (or "floating zone" method), the vertical gradient freeze (VGF) methods, and the temperature gradient methods. See, e.g., Example 1 infra. (see also, e.g., "Luminescent Materials", by G. Blasse et al, Springer-Verlag (1994) and "Crystal Growth Processes", by J. C. Brice, Blackie & Son Ltd (1986)).

In the practice of the present invention, attention is paid to the physical properties of the scintillator material. In particular applications, properties such as hygroscopy (tendency to absorb water), brittleness (tendency to crack), and crumbliness should be minimal.

TABLE I

Properties of Scintillators

| Material | Light Output (Photons/MeV) | Density (g/cm³) | Wavelength Of Emission (nm) | Rise-time (ns) | Principal Decay Time (ns) |
|---|---|---|---|---|---|
| NaI(Tl) | 38,000 | 3.67 | 415 | >10 | 230 |
| CsI(Tl) | 52,000 | 4.51 | 540 | >10 | 1000 |
| LSO | 24,000 | 7.4 | 420 | <1 | 40 |
| BGO | 8,200 | 7.13 | 505 | >1 | 300 |
| $BaF_2$ | 10,000 ~2,000 fast | 4.88 | 310, slow 220, fast | <0.1 | 620, slow 0.6, fast |
| GSO | 7,600 | 6.7 | 430 | ~8 | 60 |
| $CdWO_4$ | 15,000 | 8.0 | 480 | | 5000 |
| YAP | 20,000 | 5.55 | 370 | <1 | 26 |
| $CsLi(La_{0.5}Y_{0.5})$ Cl:Ce | ~20,000 | 3.34 | 380 | ~1-3 | 1, 30, 200, 1800 |

Table I provides a listing of certain properties of a number of scintillators. As shown, $CsLi(La_xY_{1-x})Z$ compositions of the present invention demonstrate a useful light emission spectrum comparable to other commercially available scintillators. Additional scintillation properties will be further explored.

As set forth above, scintillator compositions of the present invention may find use in a wide variety of applications. In one embodiment, for example, the invention is directed to a method for detecting energy radiation (e.g., gamma-rays, X-rays, neutron emissions, and the like) with a scintillation detector including the scintillation composition of the invention.

FIG. 1 is a diagram of a detector assembly of the present invention. The detector 10 includes a scintillator 12 optically coupled to a light photodetector 14 or imaging device. The detector assembly 10 can include a data analysis, or computer, system 16 to process information from the scintillator 12 and light photodetector 14. In use, the detector 10 detects energetic radiation emitted form a source 18.

A data analysis, or computer, system thereof can include, for example, a module or system to process information (e.g., radiation detection information) from the detector/photodetectors can also be included in an invention assembly and can include, for example, a wide variety of proprietary or commercially available computers, electronics, or systems having one or more processing structures, a personal computer, mainframe, or the like, with such systems often comprising data processing hardware and/or software configured to implement any one (or combination of) the method steps described herein. Any software will typically comprise machine readable code of programming instructions embodied in a tangible media such as a memory, a digital or optical recording media, optical, electrical, or wireless telemetry signals, or the like, and one or more of these structures may also be used to transmit data and information between components of the system in any of a wide variety of distributed or centralized signal processing architectures.

The detector assembly typically includes material formed from the scintillator composition described herein (e.g., one or more scintillator crystals). The detector further can include, for example, a light detection assembly including one or more photodetectors. Non-limiting examples of photodetectors include photomultiplier tubes (PMT), photodiodes, CCD sensors, image intensifiers, and the like. Choice of a particular photodetector will depend in part on the type of radiation detector being fabricated and on its intended use of the device. In certain embodiments, the photodetector may be position-sensitive.

The detector assemblies themselves, which can include the scintillator and the photodetector assembly, can be connected to a variety of tools and devices, as mentioned previously. Non-limiting examples include nuclear weapons monitoring and detection devices, well-logging tools, and imaging devices, such as nuclear medicine devices (e.g., PET). Various technologies for operably coupling or integrating a radiation detector assembly containing a scintillator to a detection device can be utilized in the present invention, including various known techniques.

The detectors may also be connected to a visualization interface, imaging equipment, or digital imaging equipment (e.g., pixilated flat panel devices). In some embodiments, the scintillator may serve as a component of a screen scintillator. For example, powdered scintillator material could be formed into a relatively flat plate, which is attached to a film, such as photographic film. Energetic radiation, e.g., X-rays, gamma-rays, neutron, originating from a source, would interact with the scintillator and be converted into light photons, which are visualized in the developed film. The film can be replaced by amorphous silicon position-sensitive photodetectors or other position-sensitive detectors, such as avalanche diodes and the like.

Imaging devices, including medical imaging equipment, such as the PET and SPECT devices, and the like, represent another important application for invention scintillator compositions and radiation detectors. Furthermore, geological exploration devices, such as well-logging devices, were mentioned previously and represent an important application for these radiation detectors. The assembly containing the scintillator usually includes, for example, an optical window at one end of the enclosure-casing. The window permits radiation-induced scintillation light to pass out of the scintillator assembly for measurement by the photon detection assembly or light-sensing device (e.g., photomultiplier tube, etc.), which is coupled to the scintillator assembly. The light-sensing device converts the light photons emitted from the scintillator into electrical pulses that may be shaped and digitized, for example, by the associated electronics. By this general process, gamma-rays can be detected, which in turn provides an analysis of geological formations, such as rock strata surrounding the drilling bore holes.

In many of the applications of a scintillator composition as set forth above (e.g., nuclear weapons monitoring and detection, imaging, and well-logging and PET technologies), certain characteristics of the scintillator are desirable, including high light output, fast rise time and short decay time, good timing resolution, and suitable physical properties. The present invention is expected to provide scintillator materials that can provide the desired high light output and initial photon intensity characteristics for demanding applications of the technologies. Moreover, the invention scintillator compositions are also expected to simultaneously exhibit the other important properties noted above, e.g., short decay time and good stopping power. Furthermore, the scintillator materials are also expected to be produced efficiently and economically, and also expected to be employed in a variety of other devices which require radiation/signal detection (e.g., gamma-ray, X-ray, neutron emissions, and the like).

The following examples are intended to illustrate but not limit the invention.

EXAMPLES

Example 1

The present example provides a method for growing and provides characterization for the scintillator composition crystals. The following examples are offered by way of illustration, not by way of limitation.

Crystal Growth of $Cs_2Li(La_xY_{1-x})$ Compositions

In one example, a one zone Bridgman furnace can be used for crystal growth. Typical growth rates for the Bridgman process are about 1-6 mm/hour. Growth rates ranging from about 1 mm/day to about 1 cm/hour may be utilized. The range of rates may be extended to improve material quality.

$Cs_2Li(La_{0.5}Y_{0.5})Cl_6$:Ce has a cubic crystal structure. The density of $Cs_2Li(La_{0.5}Y_{0.5})Cl_6$:Ce is about 3.34 g/cm$^3$. The composition melts congruently at approximately 635° C., respectively, and therefore their crystals can be grown using melt based methods such as those described by Bridgman and Czochralski. These melt-based processes are well suited for growth of large volume crystals (Brice, Crystal Growth Processes, Blackie Halsted Press (1986)). The Bridgman method has been used for growing $Cs_2Li(La_{0.5}Y_{0.5})Cl_6$:Ce. Both the vertical and horizontal orientations of the Bridgman method can be used in producing crystals of the present invention. In certain embodiments, the vertical Bridgman method can be used in producing crystals.

$Cs_2Li(La_{0.5}Y_{0.5})Cl_6$:Ce: Single crystals of this material were grown by the Bridgman technique in vertical silica ampoules under vacuum. Starting materials were CsCl (Aldrich, anhydrous, 99.9%), LiCl (Aldrich, anhydrous, 99.9%), and $YCl_3$, $LaCl_3$, and $CeCl_3$ (Aldrich, anhydrous, 99.99+%).

Scintillation Properties of Scintillator Compositions

Scintillation properties of small Bridgman grown scintillation composition crystals ($\leqq 300$ mm$^3$) have been characterized. This investigation involved measurement of the emission spectrum.

1. Emission Spectrum

Figure 2:
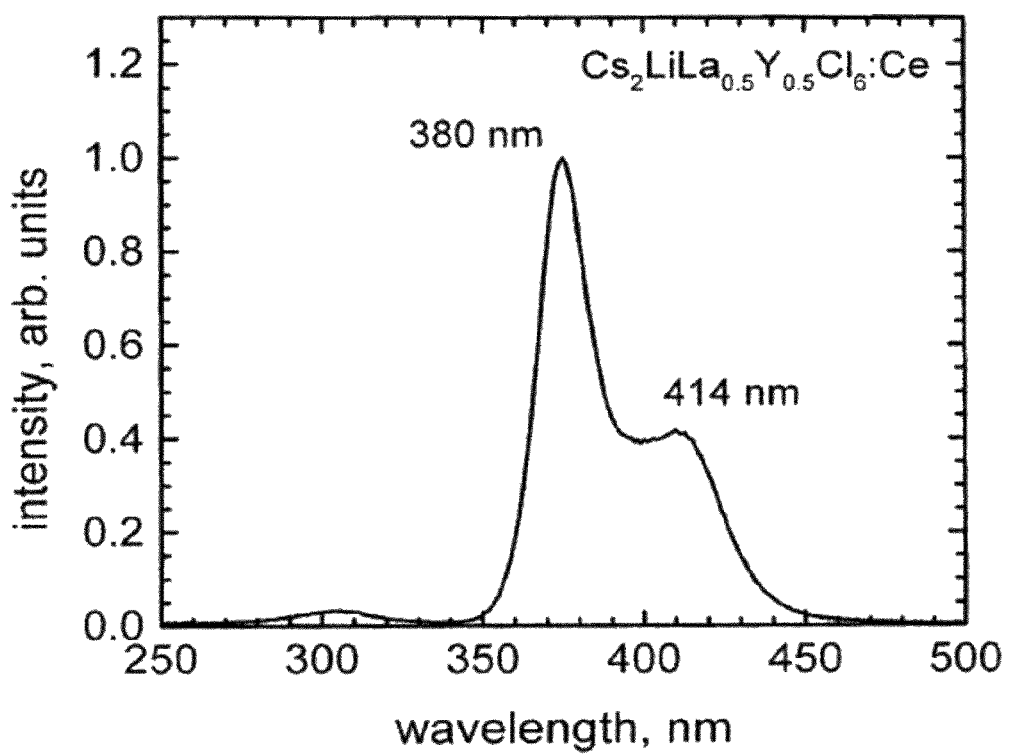
FIG. 2 depicts an emission spectrum for a mixed scintillator composition, $Cs_2Li(La_{0.5}Y_{0.5})Cl_6$:Ce, according to one exemplary embodiment of the present invention.

Normalized emission spectra for the scintillator compositions are shown in FIG. 2. The scintillator composition samples were excited with radiation from a Philips X-ray tube having a Cu target, with power settings of 40 kVp and 20 mA. The scintillation light was passed through a McPherson monochromator and detected by a photomultiplier tube. The peak emission wavelength for the $Cs_2Li(La_{0.5}Y_{0.5})Cl_6$:Ce sample was at approximately 380 nm. Peak emission wavelengths in this range are attractive for gamma-ray spectroscopy because they match well with the spectral response of the photomultiplier tubes as well as a new generation of silicon photodiodes.

2. Light Output and Energy Resolution

Figure 3:
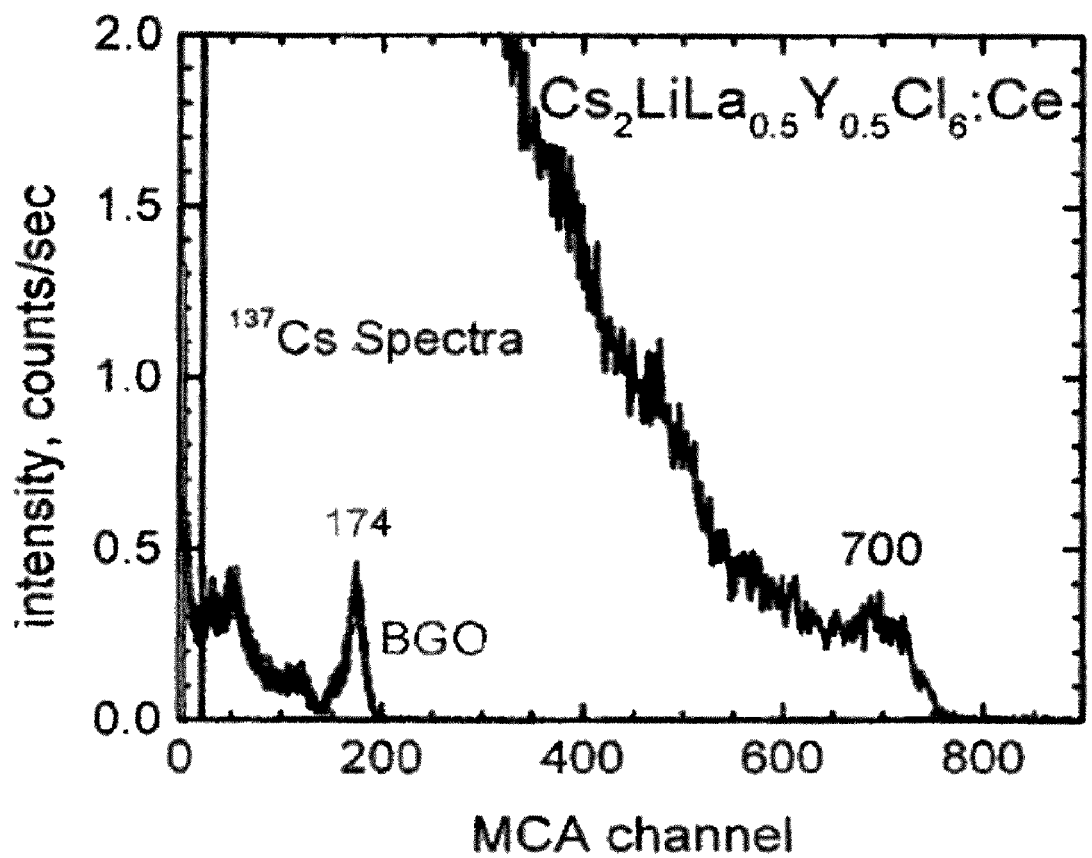
FIG. 3 depicts $^{137}$Cs spectra for a $Cs_2Li(La_{0.5}Y_{0.5})Cl_6$:Ce composition, according to an embodiment of the present invention.

The light output of scintillator composition crystals was measured by comparing their response to 662 keV γ-rays ($^{137}$Cs source) to the response of a BGO scintillator to the same isotope (see FIG. 3). This measurement involved optical coupling of a scintillator crystal to a photomultiplier tube (with multi-alkali S-20 photocathode), irradiating the scintillator with 662 keV photons, and recording the resulting pulse height spectrum. In order to maximize light collection, the scintillator composition crystal was wrapped in reflective, white Teflon tape on all faces (except the one coupled to the PMT). An index matching silicone fluid was also used at the PMT-scintillator interface. A pulse height spectrum was recorded with a scintillator composition crystal. This experiment was then repeated with a BGO scintillator. Comparison of the photopeak position obtained with the scintillator composition for 662 keV photon energy to that with BGO provided estimation of light output for the scintillator composition crystal. FIG. 3 shows the pulse height spectra for a scintillator composition and for BGO under $^{137}$Cs irradiation and amplifier shaping time of 4.0 µs. This shaping time is long enough to allow full light collection from both the scintillators. The PMT bias and amplifier gain were the same for both spectra. Based on the recorded photopeak positions for each scintillator composition and BGO, light output of a $Cs_2Li(La_{0.5}Y_{0.5})Cl_6$:Ce crystal was estimated to be about 20,000 photons/MeV.

3. Time Profiles

Figure 4:
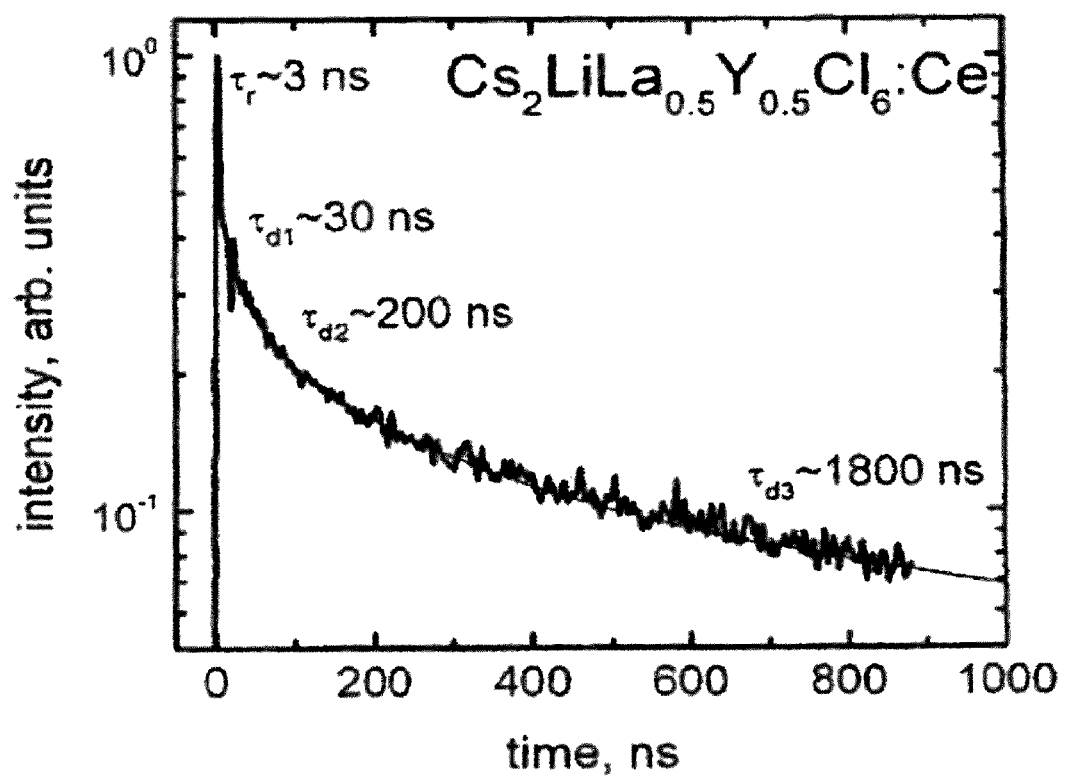
FIG. 4 depicts a time profile for $Cs_2Li(La_{0.5}Y_{0.5})Cl_6$:Ce composition, according to an embodiment of the present invention.

FIG. 4 shows a time profile recorded for $Cs_2Li(La_{0.5}Y_{0.5})Cl_6$:Ce. Time profiles of the scintillator compositions have been measured under gamma ray excitation using the delayed coincidence method (Bollinger and Thomas, *Rev. Sci. Instr.* 32:1044 (1961)) or with a digital oscilloscope. In FIG. 4, rise time for $Cs_2Li(La_{0.5}Y_{0.5})Cl_6$:Ce was ~3 ns ($\tau_r$) and decay time constants were ~30 ns ($\tau_{d1}$), 200 ns ($\tau_{d2}$), and ~1800 ns ($\tau_{d3}$).

Although the invention has been described with reference to the above examples, it will be understood that modifications and variations are encompassed within the spirit and scope of the invention. Accordingly, the invention is limited only by the following claims along with their full scope of equivalents. All publications and patent documents cited in this application are incorporated by reference in their entirety for all purposes to the same extent as if each individual publication or patent document were so individually denoted.

What is claimed is:

1. A scintillator composition, comprising a scintillator compound and a dopant, the compound having the formula $Cs_2Li(La_xY_{1-x})Z_6$, wherein Z is a halide, where x is greater than 0 and less than 1.

2. The scintillator composition of claim 1, wherein Z is a single halide.

3. The scintillator composition of claim 2, wherein the halide is F, Cl, Br, or I.

4. The scintillator composition of claim 1, wherein Z is a mixture of at least two halides.

5. The scintillator composition of claim 1, wherein the dopant comprises Ce.

6. The scintillator composition of claim 1, wherein the dopant is present at less than about 20% by molar weight.

7. The scintillator composition of claim 1, wherein the dopant comprises Ce present at equal to or less than about 5% by molar weight.

8. The scintillator composition of claim 1, wherein the compound comprises $Cs_2Li(La_{0.5}Y_{0.5})Cl_6$.

9. The scintillator composition of claim 1, wherein the scintillator comprises a crystalline, ceramic, or polycrystalline ceramic form.

10. A radiation detection or imaging device, comprising a scintillator composition comprising a scintillator compound and a dopant, the compound having the formula $Cs_2Li(La_xY_{1-x})Z_6$, wherein Z is a halide, and wherein x is greater than 0 and less than 1; and a photodetector assembly optically coupled to the scintillator.

11. The device of claim 10, wherein Z is a single halide or a mixture of at least two halides.

12. The device of claim 10, wherein the photodetector assembly comprises a photomultiplier tube, a photodiode, a PIN detector, charge-coupled device, or an avalanche detector.

13. The device of claim 10, further comprising a radiation source.

14. The device of claim 10, further comprising a computer system coupled to the photodetector assembly so that the computer outputs image data in response to detected radiation.

15. The device of claim 14, wherein the computer comprises instructions for constructing an image from detected radiation.

16. The device of claim 10, wherein the device is configured to detect x-rays, gamma-rays, neutrons, or a combination thereof.

17. A method of performing radiation detection, comprising:
    providing a detection device comprising a scintillator composition comprising a scintillator compound and a dopant, the compound having the formula $Cs_2Li(La_xY_{1-x})Z_6$, wherein Z is a halide, and wherein x is greater than 0 and less than 1; and a photodetector assembly optically coupled to the scintillator; and
    positioning the device such that a radiation source is within a field of view of the scintillator composition so as to detect emissions from the source.

18. The method of claim 17, wherein Z is a single halide or a mixture of at least two halides.

19. The method of claim 17, wherein the emissions comprise neutron, gamma-ray or X-ray emissions.

20. The method of claim 17, wherein a patient is positioned between the radiation source and the scintillator composition.

21. The method of claim 20, wherein the radiation source comprises a patient.

* * * * *